United States Patent [19]
Virzi

[11] Patent Number: 5,953,372
[45] Date of Patent: Sep. 14, 1999

[54] LOOPBACK TRANSMISSION TESTING IN A COMMUNICATIONS DEVICE

[75] Inventor: John David Virzi, Bayside, N.Y.

[73] Assignee: Standard Microsystems Corporation, Hauppauge, N.Y.

[21] Appl. No.: 08/766,496

[22] Filed: Dec. 13, 1996

[51] Int. Cl.⁶ .................................................. H04B 17/00
[52] U.S. Cl. .......................... 375/224; 375/221; 370/249; 370/224; 379/5
[58] Field of Search ..................... 375/219, 221, 375/222, 224; 370/224, 249; 371/20.5, 21.1, 21.2; 379/1, 2, 5

[56] References Cited

U.S. PATENT DOCUMENTS

| | | | |
|---|---|---|---|
| 4,953,180 | 8/1990 | Fieschi et al. | 375/219 |
| 5,115,451 | 5/1992 | Furlong | 375/221 |
| 5,557,634 | 9/1996 | Balasubramanian et al. | 375/222 |
| 5,557,751 | 9/1996 | Banman et al. | 395/250 |
| 5,600,656 | 2/1997 | Kelsey et al. | 371/20.2 |
| 5,627,858 | 5/1997 | Mak et al. | 375/225 |
| 5,652,721 | 7/1997 | Szczebak, Jr. et al. | 364/571.1 |
| 5,787,114 | 7/1998 | Ramamurt et al. | 375/221 |

FOREIGN PATENT DOCUMENTS 3721762  7/1988  Germany .

OTHER PUBLICATIONS

Multi–Standard Infrared Transeiver—Crystal Semiconductor Corporation –1994.

*Primary Examiner*—Wellington Chin
*Assistant Examiner*—Congvan Tran
*Attorney, Agent, or Firm*—Hopgood, Calimafde, Kalil & Judlowe, LLP

[57] ABSTRACT

A circuit and technique whereby loopback testing is performed in a serial communications device by concurrently transmitting from and receiving data into a single FIFO storage unit. The circuit includes a transmitter, a receiver, a single FIFO, operatively connected to both the transmitter and the receiver, for storing both transmitted and received data at the end of a loopback test. The circuit may be part of a transceiver which may in turn be part of an infrared communications controller installed in a personal computer.

14 Claims, 10 Drawing Sheets

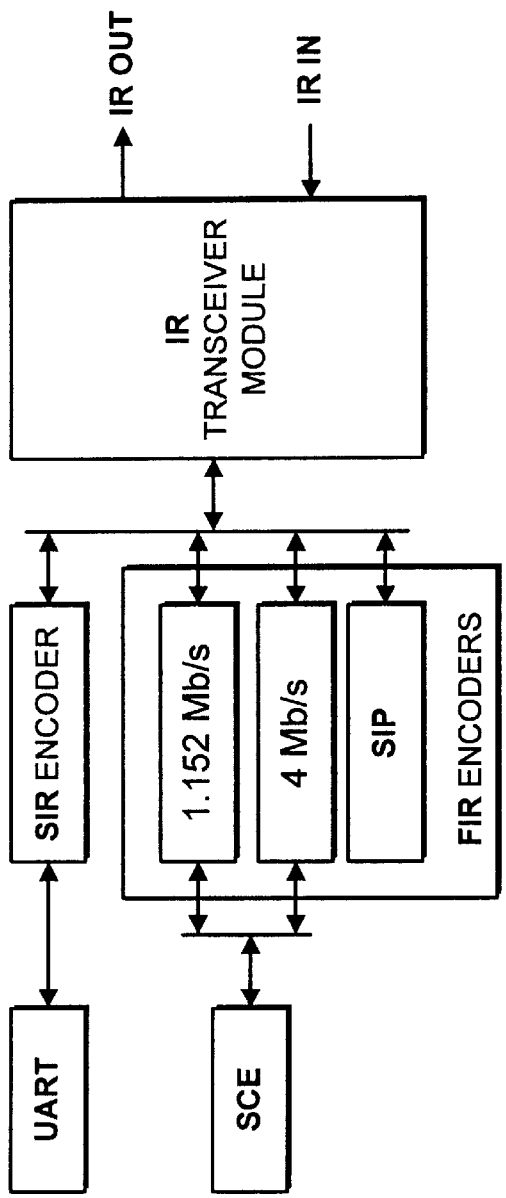
F I G. 4
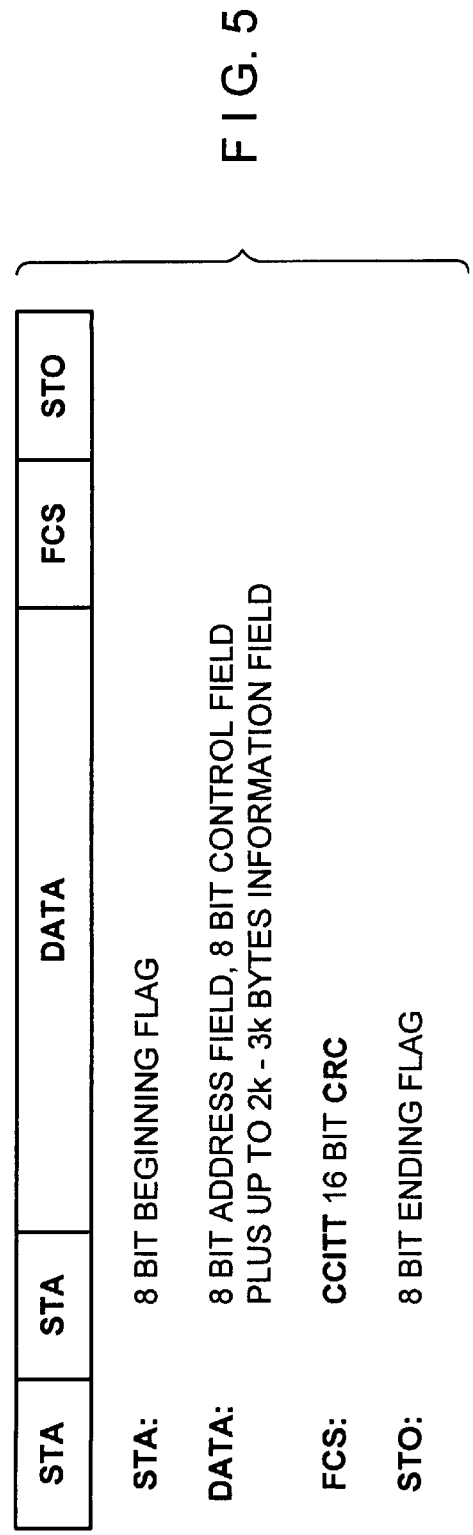
F I G. 5
STA: 8 BIT BEGINNING FLAG
DATA: 8 BIT ADDRESS FIELD, 8 BIT CONTROL FIELD PLUS UP TO 2k - 3k BYTES INFORMATION FIELD
FCS: CCITT 16 BIT CRC
STO: 8 BIT ENDING FLAG

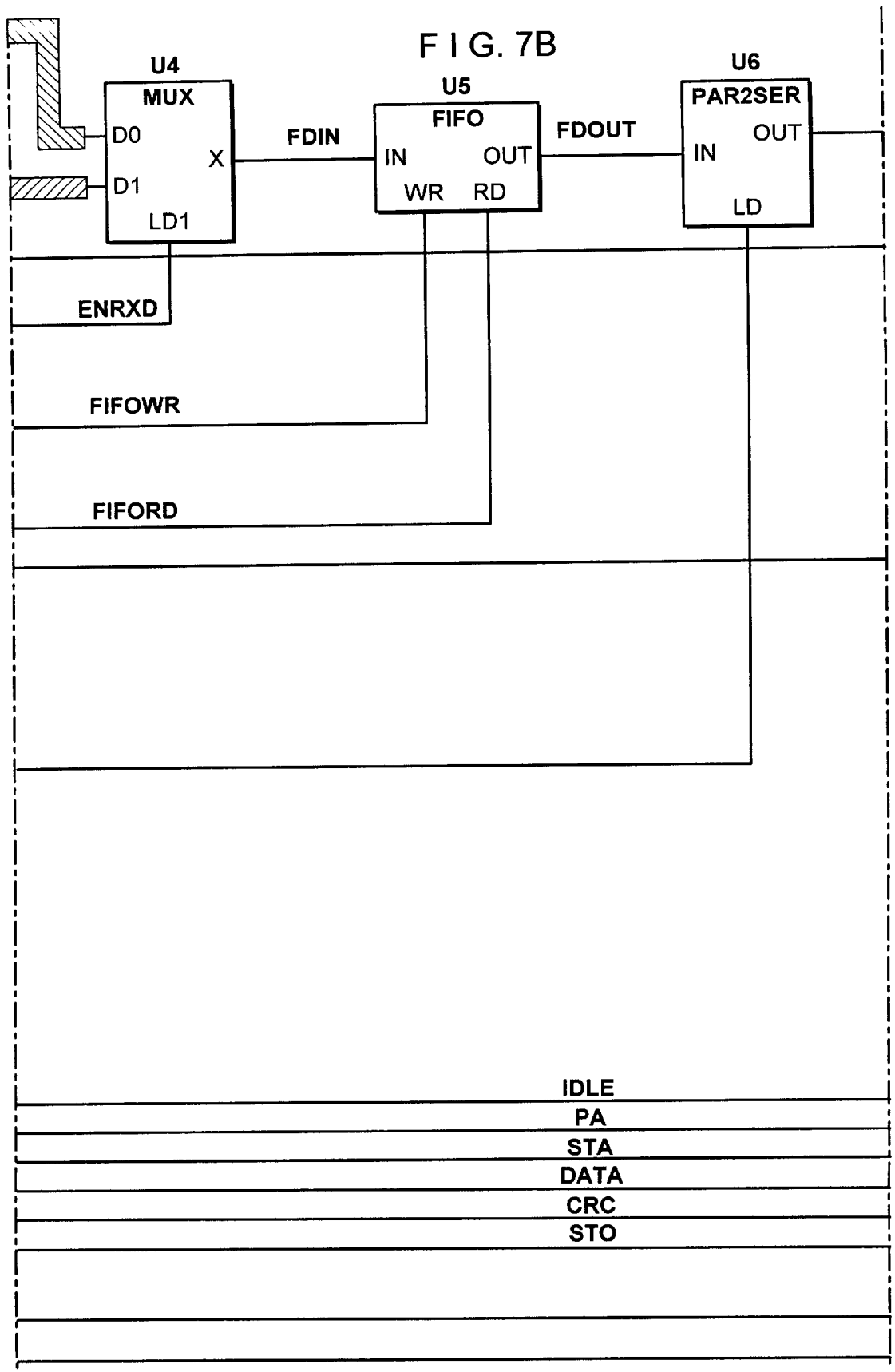

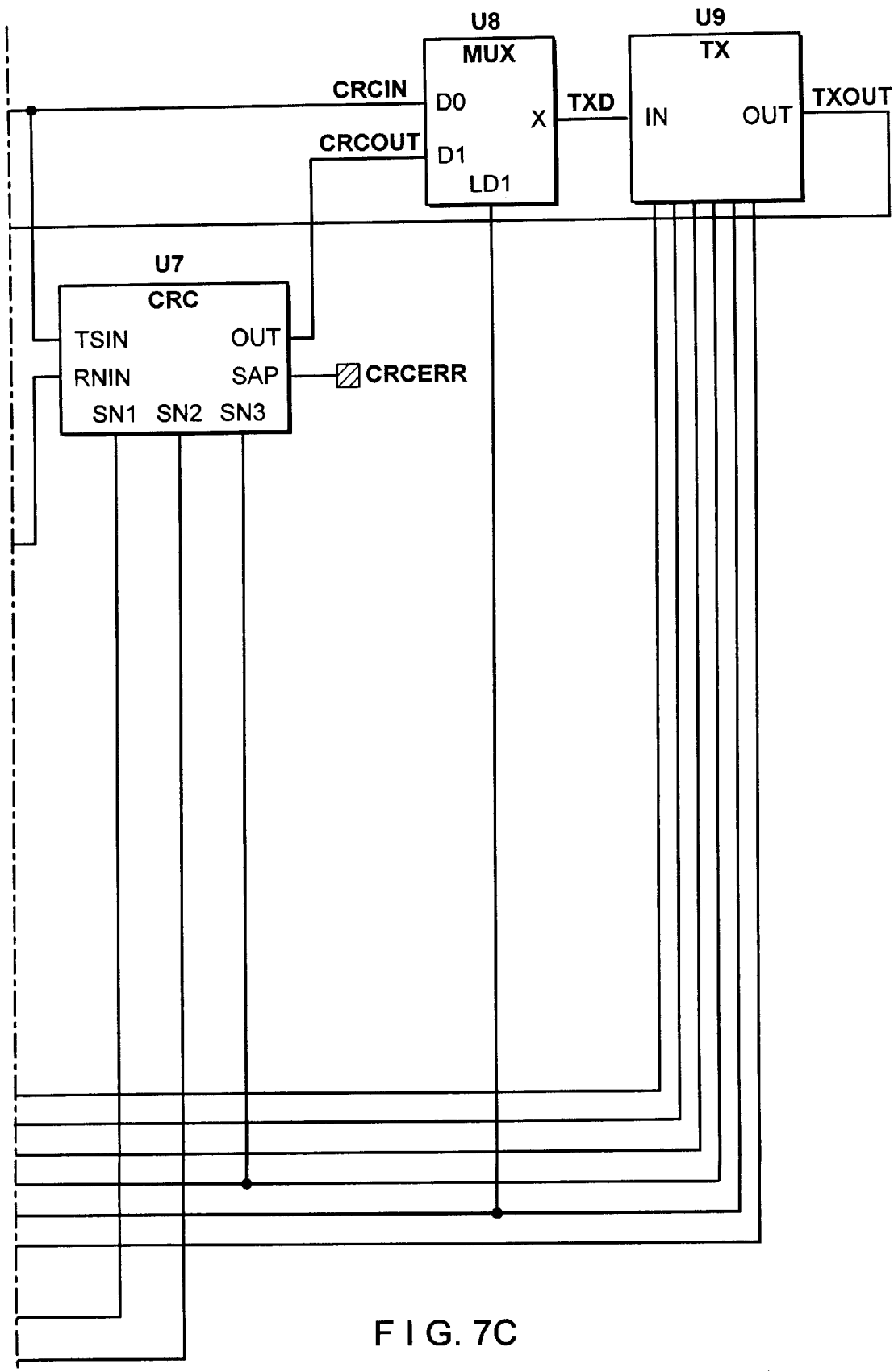
F I G. 7C

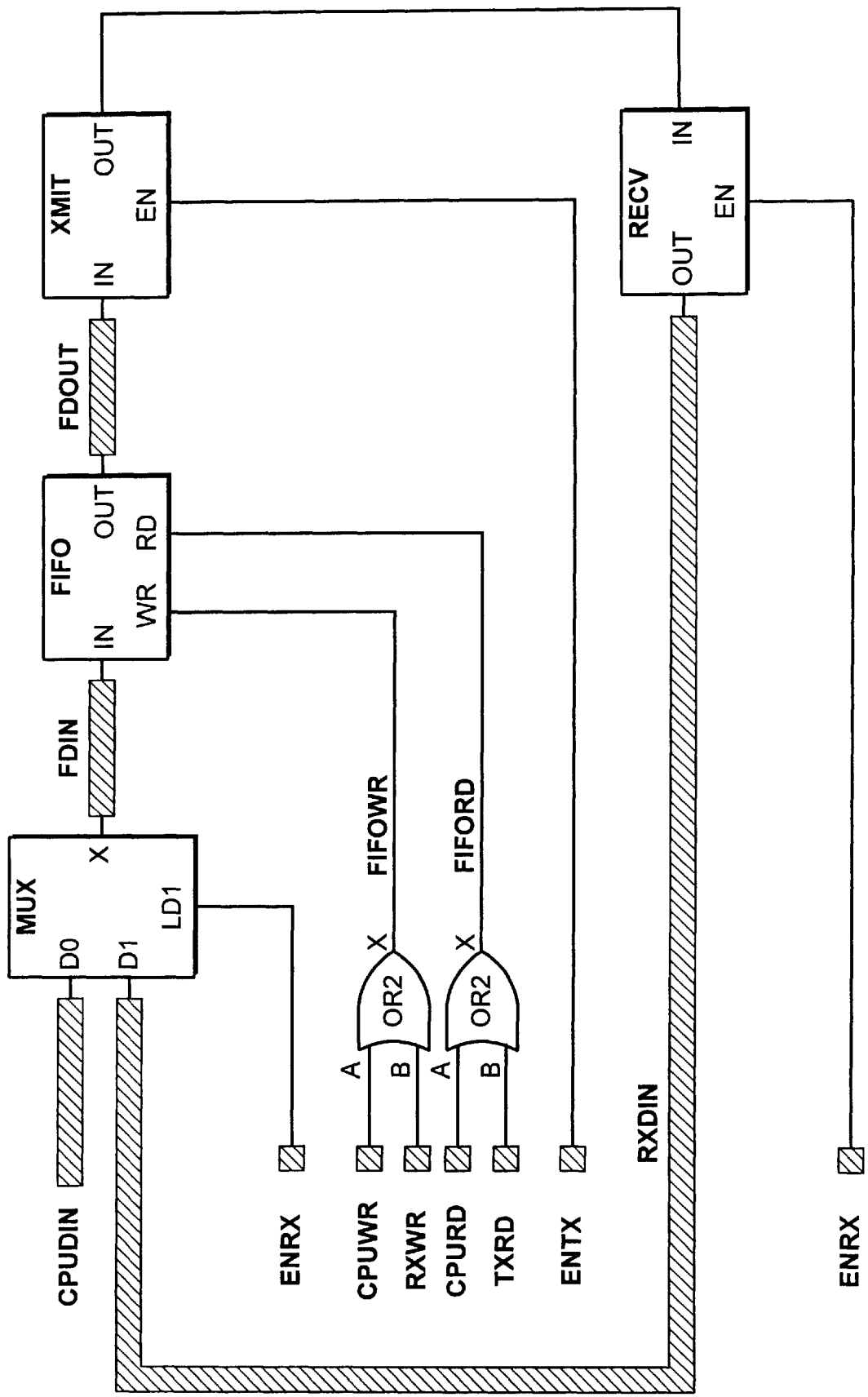
F I G. 8

LOOPBACK TRANSMISSION TESTING IN A COMMUNICATIONS DEVICE

BACKGROUND OF THE INVENTION

The present invention relates generally to Input/Output Controllers having Infrared Communications Controllers (IrCC) for personal computers, more particularly to a high-speed universal synchronous receiver/transmitter interface and most particularly to a loopback feature which enables a host processor or a host central processing unit (CPU) to test the transmitter and receiver of a communications device incorporated into the IrCC.

An IrCC typically comprises two main architectural units, a uniform asynchronous receiver/transmitter (UART) and a synchronous communications engine (SCE). Each unit is supported by its own unique register set.

In infrared communications controllers utilized with personal computers, the IrCC is usually incorporated into a semiconductor chip. When designing a semiconductor chip, there is considerable competition between the available resources or space on the chip and the ever increasing functions required to be accomplished by the applications with the limited physical size of the chip. Specifically, only recently on a chip of silicon roughly an inch square, Intel's Pentium chip held about three (3) million transistors, or tiny electronic switches. More recently, the number of transistors on the same inch square chip has been increased to between five (5) and six (6) million. Thus, while the number of transistors or electronic switches which can be implemented on a chip have increased, so has the number of functions that auxiliary chips, which communicate with the CPU are required to perform. Given this constant need for increased functions, chip designers are constantly looking for ways to decrease the amount of space, i.e., the number of electronic switches in a chip required to do a specific function.

Loopback is a well established technique to test the transmitter and logic therein as well as the receiver and logic therein of a communications device, such as, for example, a transceiver contained in an IrCC. Loopback obviates the need to establish a communications link between two separate communications devices in order to test just one of the devices and the need to test that device in a two step process, namely transmitter then receiver. Loopback essentially sets the communications device up for full duplex operation where its transmitter and receiver operate concurrently and establishes a link between the transmitter and the receiver by physically connecting the transmit data output to the receive data input. With the transmitter and receiver physically connected, a successful transmission can be verified by examining the received data and the status.

Previously, loopback functionality was incorporated in communications devices whose protocols, such as full duplex, required separate transmit and receive FIFOs or buffers. In such prior communications devices, loopback was performed by transmitting from a dedicated transmit buffer 20 and receiving the transmitted data into a separate dedicated receive buffer 22, such as, for example, in the Universal Asynchronous Receiver Transmitter (UART) serial port logic of Standard Microsystems Corporation's (SMC) FDC37C669 integrated circuit, as illustrated in FIG. 1.

As shown, the host CPU (not shown) would write data into the FIFO 20 and the transmitter 24 would be enabled. The transmitter 24 would then read the data in the FIFO 20 and the FIFO 20 would send data to the input 26 of the transmitter 24. The transmitter 24 would send the data from the transmitter output 28 to the receiver input 30. The receiver 32 would write the data to the FIFO 22 and the CPU would read the data which is contained in the FIFO 22 which would be sent to the CPU via the host CPU data output 34. As is clearly shown, with this prior art Loopback configuration for transceivers, two FIFO 20, 22 buffers are required.

Since these prior transceivers only transmitted and received data at the relatively slow rate of about 115 Kbps, only relatively small (about 16 bytes) capacity buffers were required to transmit and/or receive data. However, when the transmission/receive rate was increased to about 1.152 Mbps to about 4 Mbps, larger (128 Kbyte, i. e. about 128,000 bytes) buffers were required, and thus more space on the chip was required to accommodate the greatly increased data transfer rate. But, since space on the chip is limited, incorporation of two 128 k byte FIFOs or buffers in a chip, which would be required to do loopback testing as in the above method used with the UART transceiver, becomes prohibitive.

As is well known, the components of a personal computer motherboard or the main circuit board in a PC includes assorted micro chips. The motherboard typically includes a central processing unit (CPU) and other micro chips, such as, for example, input/output controllers.

With input/output controllers having transceivers, it is important that the chip having the transceiver incorporated therein be tested prior to being sent to the motherboard manufacture to ensure that the transceiver is operating properly. For example, in an input/output controller having a transceiver, the above described loopback test would typically be performed after the chip manufacturer had manufactured the chip and prior to the chip being sent to the motherboard manufacturer. Once the individual chip containing the transceiver passed the loopback test at the chip manufacturer, the individual chip would be then forwarded to the motherboard manufacturer for incorporation into a higher level product, such as, for example, a personal computer (PC) motherboard. At the PC motherboard manufacturer, after the chip containing the transceiver had been incorporated into a PC motherboard, the transceiver would again be tested by utilizing the loopback test procedure to insure that the transceiver was operating properly. At this point, the motherboard would be shipped to an end product manufacturer, such as, for example, a laptop personal computer manufacturer where, the motherboard containing the chip with the transceiver would be incorporated into a personal computer. At this point, once again the chip containing the transceiver would be tested utilizing the loopback test procedure.

Thus, there is a need for a new improved loopback transmission testing for a communications device, such as those used in a synchronous communication engine (SCE). The circuit required for the implementa-tion of loopback transmission testing should occupy as little space as possible on the chip; should perform the loopback testing utilizing only a single FIFO or buffer; should provide ease of component (chip) and board (motherboard) testability and should provide data integrity.

SUMMARY OF THE INVENTION

It is accordingly one object of the present application to provide a new improved loopback transmission testing for a communications device, such as those used in a synchronous communication engine (SCE).

Another object of the present application is to provide a circuit required for the implementation of loopback transmission testing which occupies as little space as possible on the chip.

Still another object of the present application is to provide a circuit which performs loopback testing utilizing only a single FIFO or buffer.

It is yet another object of the present application to provide a circuit which provides ease of component (chip) and board (motherboard) testability and data integrity.

The present application achieves the above objects by providing, in one embodiment, a loopback circuit for testing a communication device, the loopback circuit comprising: a transmitter; a receiver; a single FIFO, operatively connected to both the transmitter and the receiver, for storing both transmitted and received data at the end of a loopback test.

A second embodiment of the present invention includes a transceiver comprising: a transmitter; receiver, the transmitter being operatively connected to the receiver; a single FIFO, operatively positioned in the transceiver, for receiving both transmitted data and received data; state control means, operatively connected to the transmitter, the receiver and the FIFO, for controlling the transmitter or controlling the receiver; and a loopback circuit for testing a communication device, including a byte counter limiting the number of data bytes to be transmitted, the loopback circuit being operatively connected to the transmitter, the receiver and the single FIFO during loopback testing of the transceiver.

A third embodiment includes an infrared communications controller comprising: a synchronous communications engine (SCE) means; clock generator means; a plurality of register means; bus interface input/output means; encoder means, for communicating with the clock generator means the bus interface input/output means, the register means, and the SCE means; an output multiplexor, operatively connected to the encoder means, for communication with an IR transducer module, a communications port and an auxiliary port; and loopback circuit means, operatively positioned in the SCE means, for performing a loopback test, the loopback circuit means further comprising: a transmitter; a receiver; a single FIFO, operatively connected to both the transmitter and the receiver, for storing both transmitted and received data during loopback testing.

Other objectives and advantages of the present application will become apparent from the following description, the accompanying drawings and the appended claims.

BRIEF DESCRIPTION OF THE DRAWINGS

FIG. 4 is a block diagram of the Infrared Communications Controller;

FIG. 5 is a block diagram of a frame format for the encode/transmit and receive/decode synchronous serial data for the 1.152 Mbps rate;

FIG. 8 is a generic block diagram of the Loopback configuration for a transceiver of the present invention.

DETAILED DESCRIPTION OF THE INVENTION

Figure 1:
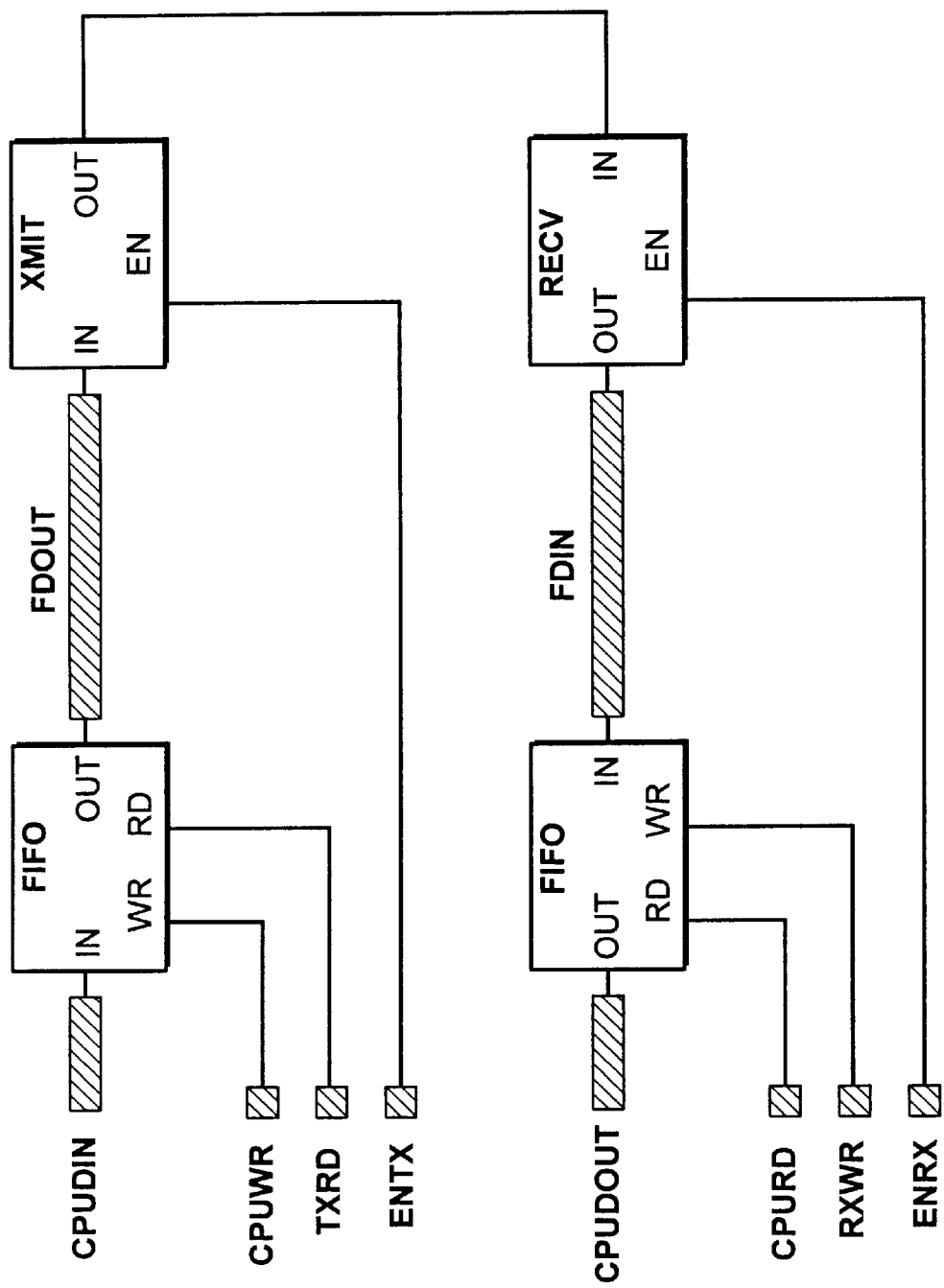
FIG. 1 is a generic block diagram of a Loopback configuration for a prior transceiver.
Figure 2:
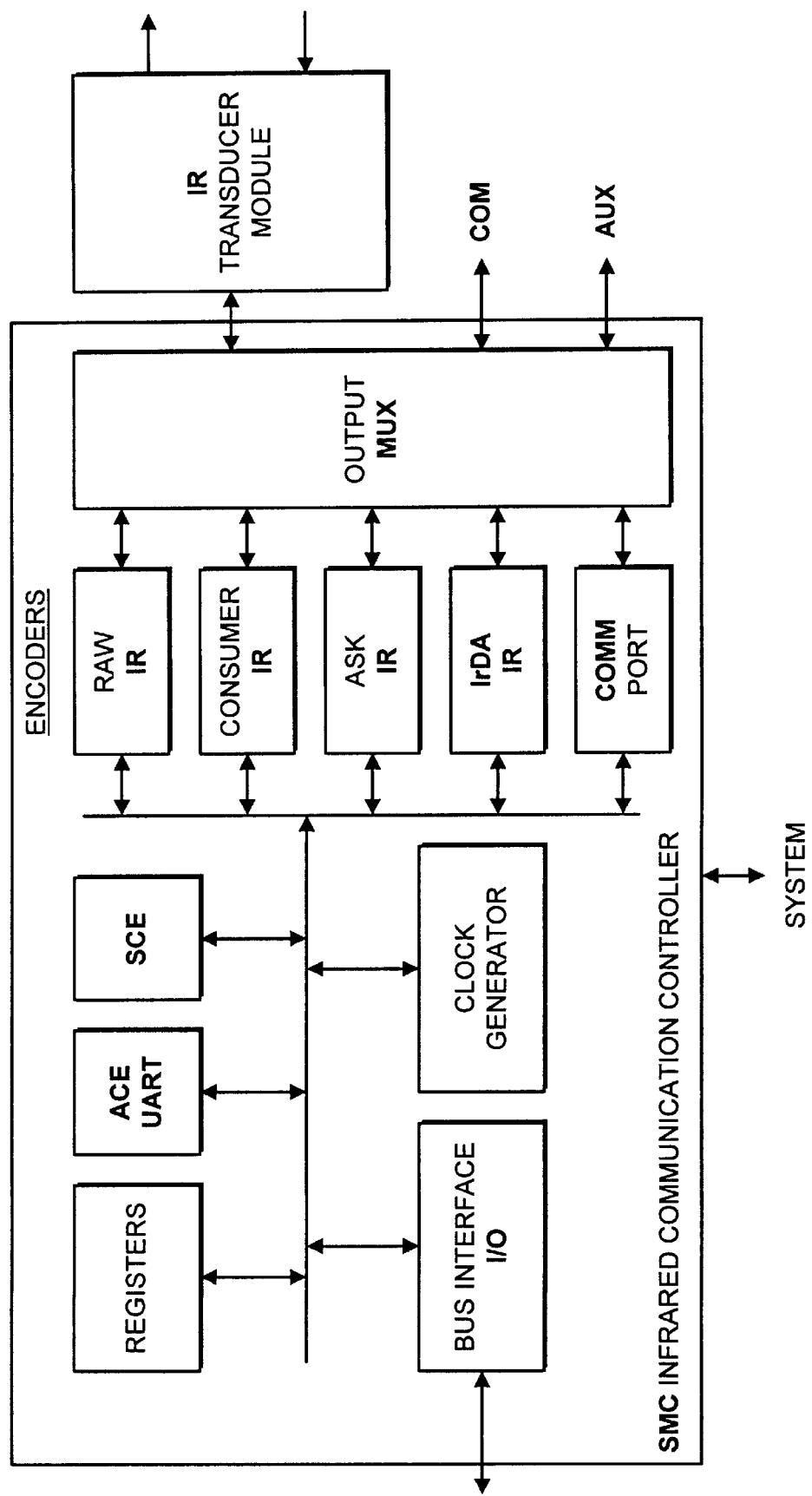
FIG. 2 is a functional block diagram illustrating the serial port logic of an Infrared Communications Controller incorporating the Loopback configuration of the present application.
Figure 3:
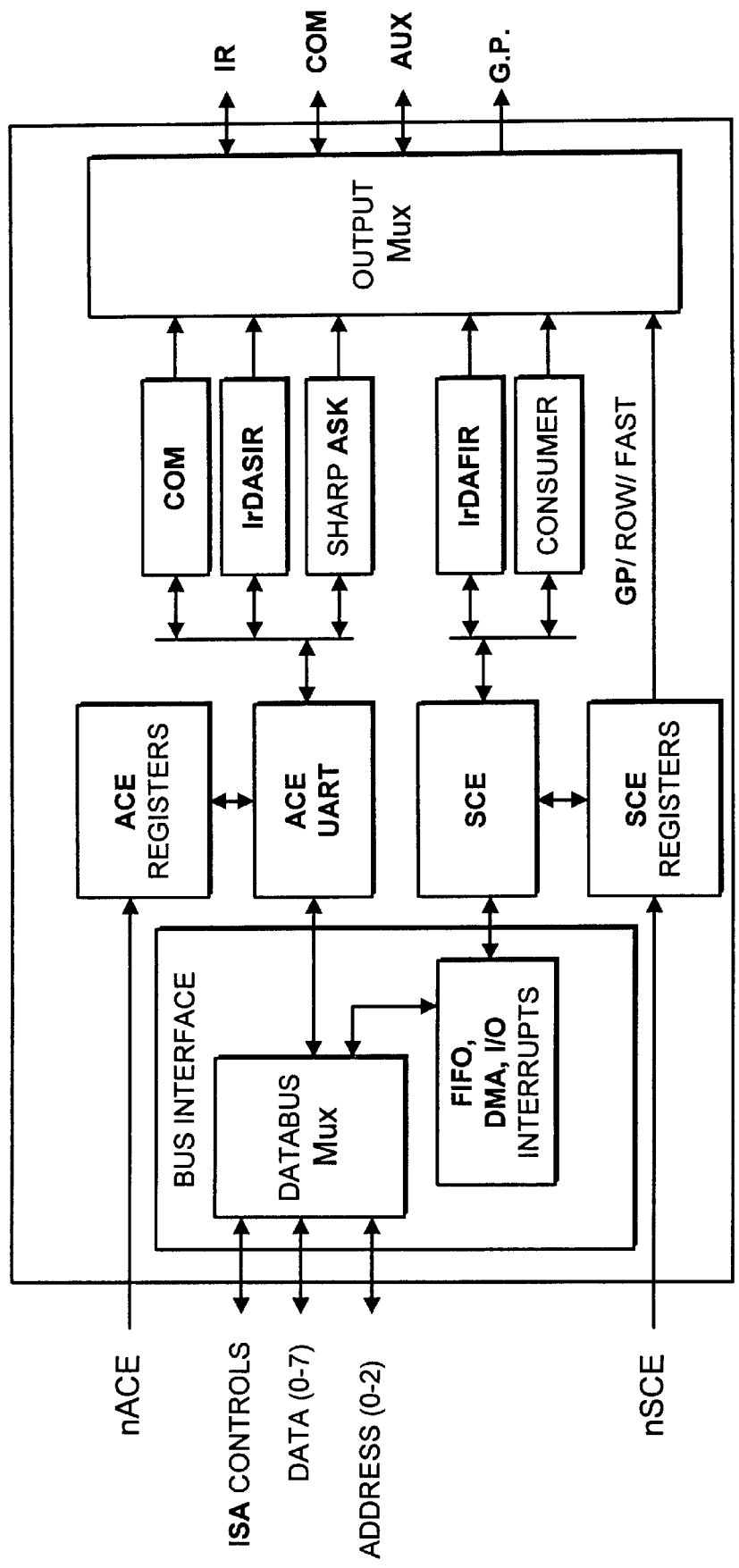
FIG. 3 is an architectural block diagram illustrating the serial port logic of an Infrared Communications Controller incorporating the Loopback configuration of the present application.

As illustrated in FIGS. 2–4. the Infrared Communications Controller (IrCC) 40 which incorporates the Loopback feature comprises a UART 42 and a Synchronous Communications Engine (SCE) 44, each having its own unique register sets 46, 48. The IrCC 40 offers flexible signal routing and programmable output control through the serial Data pins and Output Multiplexor. Chip-Level address decoding is required to access the IrCC register sets. FIG. 2 illustrates the IrCC 40 functional components and FIG. 3 illustrates its architectural block diagram.

The Infrared Data Association (IrDA) was created to develop an inter-operable, low-cost, low-power, half-duplex serial data inter-connection standard that supports a walk-up, point-to-point user model that is adaptable to a wide range of appliances and devices. The high-speed extensions (FIR) 52 to the IrDA physical layer appear as alternate modulation and demodulation paths for data from SIR-Link Access Protocol (IrLAP) bound for the Infrared (IR) median and are transparent to IrLAP as it is defined for SIR 50. A block diagram of one end of an IrDA link that includes the SIR 50 and FIR 52 physical implementations is shown in FIG. 4.

As shown, the SIR Interaction Pulse (SIP) is intended to guarantee non-disruptive coexistence with SIR-only systems which otherwise might interfere with Fast IR links. A SIP is defined as a 1.6 microsecond transmitter pulse followed by a 7.1 microsecond off time. Once a Fast connection has been established, a station or computer will generate one SIP every 900 ms.

The details of the infrared communications controller having the Loopback feature is described in a document entitled, Infrared Communications Controller by Standard Microsystems Corporation, 300 Kennedy Drive, Hauppauge, N.Y. 11788 and is identified as IrCC Rev. May 10, 1996, the disclosure of which is incorporated herein by reference.

As indicated in the above document, a SMC super or ultra I/O chip typically includes a floppy disk controller circuit, a hard disk controller interface, a parallel port controller, a serial port controller and an infrared controller, a keyboard controller and a real time clock.

Figure 6:
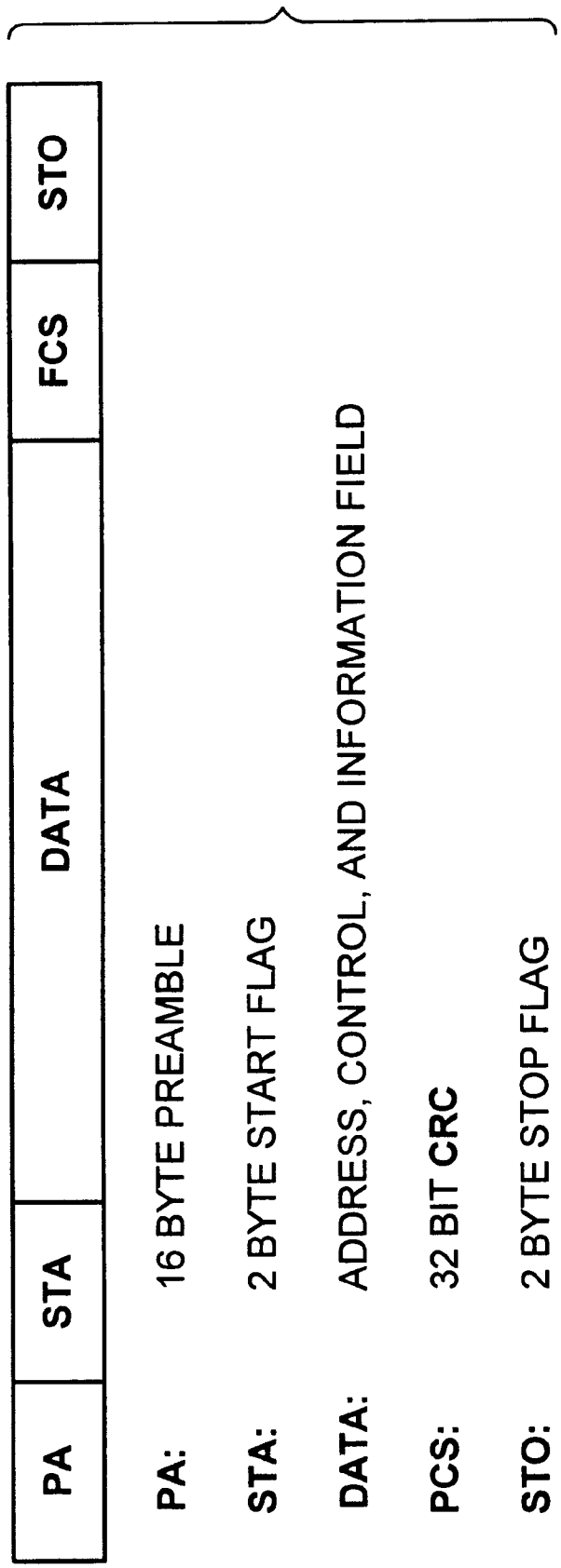
FIG. 6 is a block diagram of the frame format for the encode/transmit and receive/decode synchronous serial data for the 4 Mbps rate.

The transceiver that incorporates the Loopback circuit, which is the subject of the present application, conforms to the IrDA IR Link Management Protocol (IRLMP), the Infrared Data IrDA Infrared (IR) Link Access Protocol IrLAP and the fast (FIR) extensions to the IrDA physical layer link specification in that it encodes/transmits and receives/decodes synchronous serial data organized in a specific format called a frame 54, 56 illustrated in FIG. 5 for the 1.152 Mbps rate and FIG. 6 for the 4 Mbps rate.

Figure 7A:
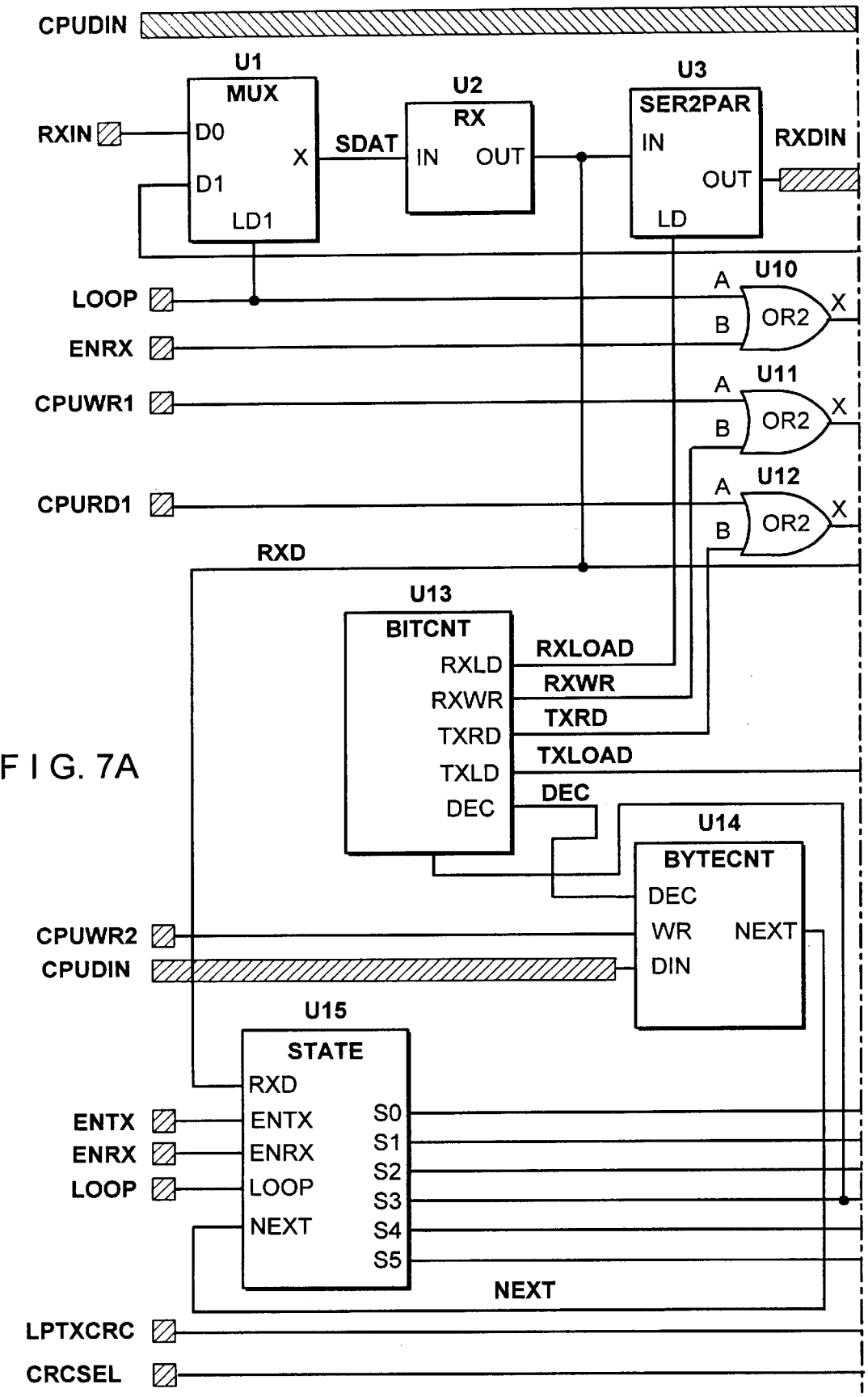
FIG. 7 is a detailed block diagram of a representative transceiver incorporating the Loopback configuration of the present invention.

Before describing the details of the loopback feature of the present invention, it might be best to describe the normal operation of the transceiver which incorporates the loopback feature. Under standard half duplex operating conditions, only the transmitter or the receiver of transceiver may be enabled at any one time. Referring now to FIG. 7, when the transceiver 60 is in transmit mode and the Loopback is not enabled, signals Enable Receiver (ENRX) 64, Loopback Enable (LOOP) 66 and Enable Receiver Data (ENRXD) 68, the output of OR gate 70, are inactive allowing the host Central Processing Unit (CPU) (not shown) to write host CPU Data Input (CPUDIN) 72 under program control through data multiplexor 74 to the FIFO or buffer 76, preferably having a storage capacity of about 128 k byte, for later transmission.

Because of the rate at which the data is either transmitted or received, the transceiver buffer 76 used in the circuit is greatly increased in size over the individual buffers used in the prior infrared transmitting circuit discussed in the background of the invention. As discussed in the background, because the data transmission and receiving rate has been increased to a rate of about 1.152 mbps to about 4 mbps, it is necessary that the transceiver buffer 76 have sufficient storage capacity so that the data either being received or transmitted by the transceiver 60 can be completely transmitted/received without any data being lost due to the inability of the chip to process data at the increased rates of 1.152 mbps to about 4 mbps.

Host CPU Data Input (CPUDIN) 72 is written a byte (8 bits) at a time when OR gate 78 passes the input Central Processing Unit Write buffer (CPUWR1) 80 to the Write (WR) input 82 of the buffer 76. The buffer's write pointer increments once for each CPUWR1 80 event. Transmission of a single frame, See FIGS. 5 and 6, begins when Enable Transmitter (ENTX) 84 is active. State control means 86 deasserts the IDLE state signal 88 thus leaving the IDLE state and transmitter 89 assembles, encodes and transmits the beginning flags when state control means 86 asserts the sixteen (16) byte preamble (PA) state signal 90 or the start flag (STA) state signal 92.

Bit counter means 94 counts eight (8) bit times for each byte so as to decrement (DEC) 95 byte counter 96 for every byte sent. When byte counter 96 counts the appropriate number of PA or STA bytes, as shown in FIGS. 5 and 6, it generates the NEXT signal 98 and those states are exited. When the state control means 86 deasserts the STA 92 state signal, the parallel to serial converter means 100 reads and loads one Buffer Data Out (FDOUT) 102 data byte from the buffer 76 for every serial data byte sent under control of the Transmitter Read Data (TXRD) 104 and Transmitter Load (TXLOAD) 106 signals generated by bit counter means 94 as long as the DATA state signal 107 remains asserted. OR gate 108 passes TXRD 104 to the RD input 110 of the buffer 76. The buffer's read pointer increments once for each TXRD 104 event. Transmitter TX means 89 encodes and transmits the data and state control means 86 deasserts the DATA state signal 107 when the buffer 76 is empty as indicated by the FIFO Empty signal 121 $F_{empty}$. Once the FIFO is empty, this signal is communicated to the state controller 86 via input $F_{empty}$ 122.

If the Select CRC (CRCSEL) 112 input is active, Cyclic Redundancy Check (CRC) means 114 will calculate a CRC value for the data and the state control means 86 asserts the CRC state signal 123 allowing data multiplexor 120 to pass the data to transmitter TX means 89 for encoding a transmission. When byte counter 94 counts the appropriate number of CRC bytes as shown in FIGS. 5 and 6, it generates the NEXT signal 98 and the state control means 86 deasserts the CRC state 123, thus leaving the CRC state. When the state control means 86 deasserts the CRC state signal 123, transmitter TX means 89 assembles, encodes and transmits the ending flag while state control means 86 is asserting the ending or stop flag (STO) state signal 124. When byte counter 96 counts the appropriate number of STO bytes, as shown in FIGS. 5 and 6, it generates the NEXT signal 98 and state control means 86 deasserts the STO 124 state signal and reasserts the IDLE state signal 88, thus returning to the IDLE state. If CRCSEL 112 is inactive, state control means 86 deasserts the DATA state signal 107 and asserts the STO 124 state signal thus entering the STO state directly. In this case, the host CPU does not make use of the cyclic redundancy check CRC means 114 to calculate the CRC but calculates it in software and writes it into the buffer 76 after the data.

When the transceiver 60 is in the receive mode and loopback is not enabled, signal LOOP 66 is inactive allowing the serial receive data stream to be taken from the encoded Receive Data In (RXIN) 125 input through data multiplexor 126. Enable Receiver (ENRX) 64 is active. Receiver (RX) means 91 recovers and synchronizes the receive data. The Received data (RXD) 128 is examined for the presence of beginning flags (STA) 92 by state control means 86. When valid non-flag data is found, bit counter 94 generates the signal Receiver Load (RXLOAD) 130 so that the serial to parallel converter means 132 can assemble one byte of receiver data input (RXDIN) 134 one byte at a time. Signals enable receiver (ENRX) 64 and enable receiver data (ENRXD) 68, the output of OR gate 70, are active allowing receiver data input (RXDIN) 134 to be written through data multiplexor 74 to the buffer 76 when OR gate 78 passes the receiver write (RXWR) signal 136 to the write (WR) 82 input of the buffer 76. The buffer's write pointer increments once for each receiver write (RXWR) 136 event. The host CPU may read buffer data output (FDOUT) 102 a byte at a time when OR gate 78 passes the input host CPU read buffer (CPURD1) 140 to the read (RD) 110 input of the buffer 76. The buffer's read pointer increments once for each host CPU read data (CPURD1) 140 event.

Since IrDA is a half duplex protocol there in no need for separate transmit and receive buffers. This is a real benefit in terms of complexity and cost for an integrated circuit, especially since only a single 128 k byte deep buffer 76 is required. However, as described below, the elimination of separate transmitter and receiver buffers poses problems for testability which is normally facilitated by a loopback mode.

After the host CPU has loaded the buffer 76 with data and optional cyclic redundancy check (CRC) bytes, active input LOOP 66 enables both the transmitter 200 and the receiver 202, allows multiplexor 126 to pass transmitter out (TXOUT) signal 142, and allows multiplexor 74 to pass receive data input (RXDIN) signal 134 to the data input 144 of the buffer 76. For each data byte that the transmitter 200 reads from the buffer 76, the receiver 202 writes it to the buffer 76 so that the buffer 76 is never empty, which is the condition for the State control means to deassert the data state signal 107 thus leaving the data state.

If the host CPU does not abort the transmission in progress, the transceiver 60 transmits and receives continually never leaving the data state and retransmits data it has already received. As the buffer's read pointer is continually incrementing under these conditions, the host CPU cannot reliably read data in the buffer to verify loopback. On the other hand, if the host CPU does abort the transmission in progress, the buffer will go empty and data will be lost for verification.

These problems are solved by stopping the transmission in a consistent way thereby allowing buffer data to be stored in a format that allows transmit data to be distinguished from receive data and without retransmitting received data.

A generic block diagram of the Loopback configuration circuit for the transceiver 60 of the present invention is illustrated in FIG. 8. As shown, loopback is performed by transmitting data from the transmitter 200 and writing that data from the receiver 202 into a single shared FIFO buffer 204. After the host CPU (not shown) has loaded the FIFO buffer 204 with transmit data (CPUDIN) 206, the host CPU puts the transceiver 60 in loopback mode, which enables both the transmitter (EnTx) 208 and the receiver (ENRX) 210. The transmitter 200 reads data from the FIFO (TXRD) 212 and transmits it to the receiver 202. The receiver 202 receives that data and writes it back (RXWR) 213, through the multiplexor 214 into the FIFO 204. The host CPU may then read the FIFO data to verify the transmission.

Specifically, as illustrated in FIG. 8, the host CPU data input (CPUDIN) 206 is received at the multiplexor 214. The multiplexor 214 passes the data from the host CPU to the FIFO buffer 204 as FIFO data input (FDIN) 216. At this point, after the CPU has loaded the FIFO 204 with transmit data, the CPU puts the transceiver 60 in loopback mode which enables both the transmitter 200 and the receiver 202. The transmitter 200 reads data from the FIFO 204 data output (FDOUT) 218 and transmits the data to the receiver 202. The receiver 202 then writes the data back through the multiplexor 214 to the FIFO 204 as receiver data input (RXDIN) 220. The CPU then reads (CPURD) 222 the FIFO data at (FDOUT) 218 to verify the transmission.

Referring again to FIGS. 7 and 8, Loopback requires that the transmit data output 230 be connected to the receive data input 232 and that both the transmitter 200 and the receiver 202 be enabled. Data multiplexor 126 of FIG. 7 is included for illustrative purposes only but is not necessary to the practice of the present invention. The multiplexor 126 provides a path to connect the transmit data output 142 to the receive data input 125 for loopback operation but the same could be achieved without the multiplexor 126 by physically connecting the transmit data output 142 to the receive data input 125 external to the chip.

Referring now to FIG. 7, Loopback is performed when the host central processing unit (CPU) drives CPU write byte count (CPUWR2) 162 and CPU data input (CPUDIN) 72 to load byte counter 96 with the data byte count defined as the number of data bytes to be transmitted and loads the buffer 76 with a number of data bytes either equal to or greater than the byte count and then enables the transmitter 200 and receiver 202 with loopback (LOOP) 66. Byte counter 96 assures that transmitter 200 reads (TXRD) 104 and receiver 202 writes (RXWR) 136 do not occur at the same time. Receiver write (RXWR) 136 always follows the transmitter read (TXRD) 104 corresponding data to the same data byte. The transmitter read data (TXRD) 104 corresponding to the next data byte does not occur until after RXWR 136 of the previous byte. When byte counter 96 counts that the number of data bytes sent equals the chosen byte count, it generates the NEXT signal 98 and state control means 86 exits the DATA state.

If the Loopback Transmit CRC Enable (LPTXCRC) 166 input is active, CRC means 114 will calculate a CRC value from the data for the transmitter 200 and CRC means 114 will not perform CRC checking for the receiver 202. If the Loopback Transmit CRC Enable (LPTXCRC) 166 input is inactive and Select CRC (CRCSEL) 112 is active, CRC means 114 will not calculate a CRC value for the transmitter 200 but will perform CRC checking for the receiver 202.

The functionality of the CRC means 114 checking logic can be verified by loading an erroneous CRC value for the transmit data field into the buffer 76 and observing the assertion of CRC error (CRCERR) 198. At the end of the transmit and receive, the buffer 76 will contain both transmit and receive data and, optionally, the received CRC bytes generated in hardware by the CRC means 114 for the transmitter 200.

Therefore, care must be exercised by the host CPU in loading a number of transmit data bytes so as to leave sufficient room for all received data and optional CRC bytes. Data transmission will stop when the number of data bytes transmitted has equaled the value of the byte count register. In this way, received data will not be retransmitted. If CRC data is generated in hardware by the CRC means 114 for the transmitter 89 and appended to the end of the transmit data, then the CRC data distinguishes transmit data from receive data which would otherwise be identical, unless a fault were uncovered by the test. If not, the transmit data can be distinguished from receive data by letting the host CPU load the buffer 76 with more data bytes than specified by the byte count and these bytes will buffer the transmit data from the receive data. The buffer 76 has separate read and write pointers so that the receiver 202 will begin writing the next available byte location after the last transmit byte location and the read pointer will initialize to the first transmit byte location and increment through the last transmit byte location as defined by the byte count, then the optional extra transmit byte locations, then the first receive byte location to the last receive byte location.

Figure 9:
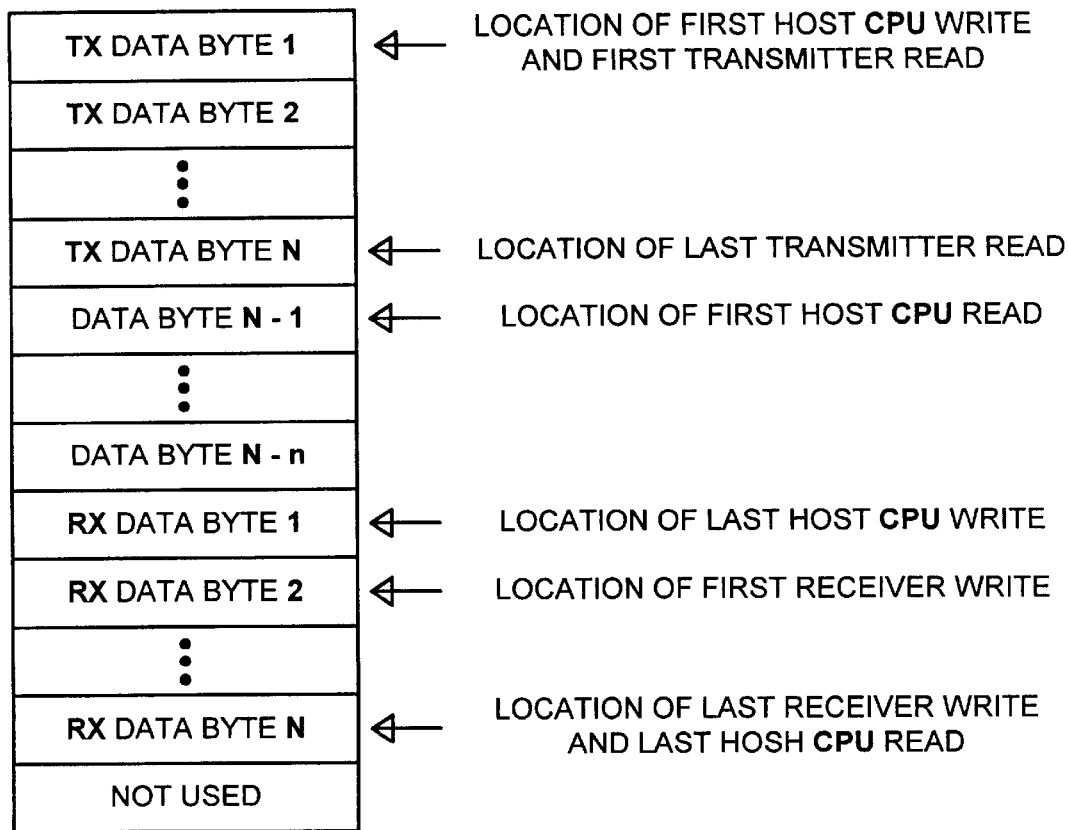
FIG. 9 is a block diagram of the FIFO data format after completion of Loopback test with data byte counts of N and loopback transmit CRC disabled.
Figure 10:
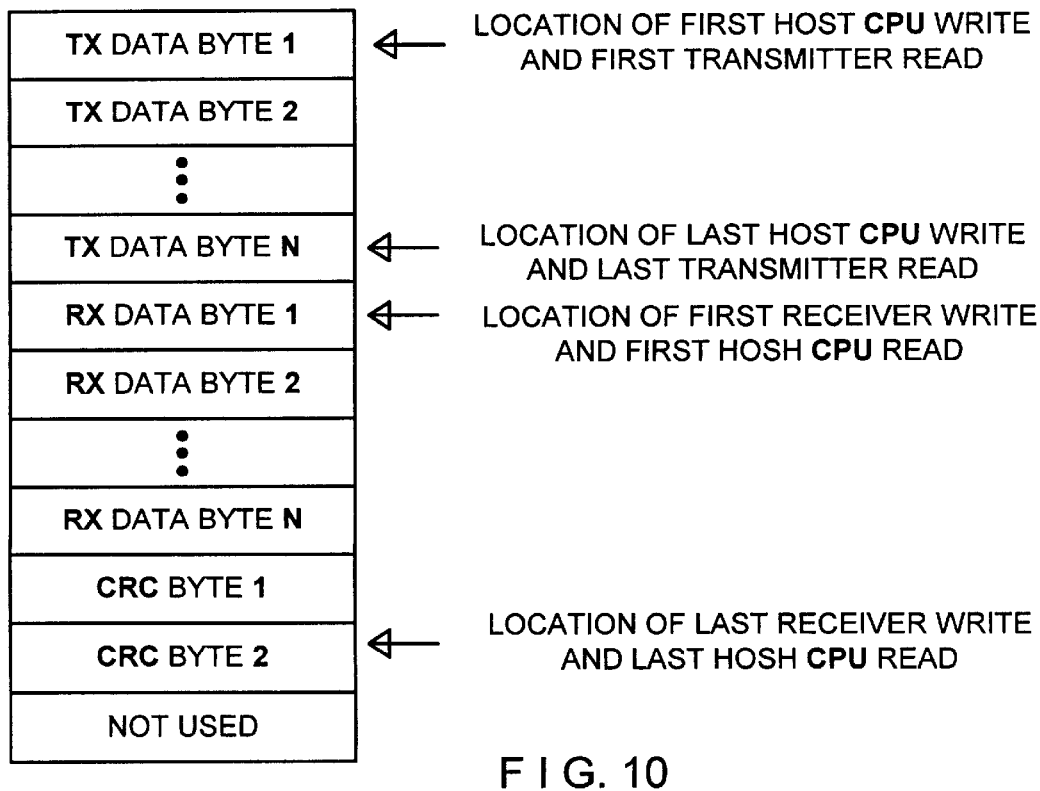
FIG. 10 is a block diagram of the FIFO data format after completion of a 1.152 Mbps Loopback test with data byte count of N and loopback transmit CRC enabled.

Transmitter 200 reads end with the last transmit data byte and host CPU reads to verify data begin with the first extra transmit data byte 260, as also shown in FIG. 9, or the first receive data byte 262, as shown in FIG. 10, and end with the last receive data byte or optional CRC bytes 266 generated by CRC means 114 for the transmitter 200.

The Loopback feature of the present invention has been implemented in Standard Microsystems Corporation products, such as, for example, several products identified as FDC37C957FR, FDC37C93XFR, and FDC37C669FR. In these products, the innovative Loopback feature provides ease of chip and motherboard testability. Specifically due to the full duplex nature of the loopback test, without the shared transmit/receive buffer implementation, component manufactures would not be able to perform loopback testing unless they used a transceiver having two separate buffers, as did those mentioned in the prior art. But, because two buffers would occupy entirely too much space in the chip, the innovative loopback circuit and method of the present invention adds value to the product at all stages of computer manufacture. In addition, due to the full duplex nature of the loopback test and with the shared transmit/receive buffer implementation, component manufacturers would not be able to perform loopback testing without encountering data integrity problems unless they used the innovative loopback circuit and method of the present invention.

Specifically, with regard to data integrity, given the condition that a single FIFO shared between the transmitter and the receiver, the condition for stopping the transmission of data is that the FIFO or buffer is empty. Once the FIFO reports that it is empty ($F_{empty}$), state control means stops transmitter means from further transmitting data from the FIFO. However, in loopback, the transmitter transmits data to the receiver and the receiver writes that data back into the FIFO. Under the loopback as described above, the FIFO never becomes empty and thus the transmitter never stops transmitting data from the FIFO. In this condition, the data that is written gets transmitted and written again and again resulting in continuous loopback.

In order to solve this potential continuous loopback problem, a byte counter is utilized for indicating the exact number of bytes to transfer. When the number of bytes that were indicated to be transferred are transmitted, the transmitter stops transmitting. As shown in FIG. 9, for example, let us assume that the CPU has loaded the FIFO with fifteen (15) bytes and that the CPU has loaded the byte counter with a byte count indication that the transmitter is to send ten (10) of the bytes during the loopback test. The transmitter then sends the ten (10) bytes but does not send the remaining five (5) bytes. The receiver will proceed to receive the ten (10) bytes that were transmitted and put them back into the FIFO. When loopback testing is finished, the first bytes in the FIFO will be the ten (10) transmit bytes that were there. The next five will be the five (5) that were never transmitted and the following ten (10) bytes will be the transmitted and received bytes.

The point at which the CPU will start verification of the transmitted and received bytes is with the five (5) untransmitted bytes. Since the ten (10) transmitted bytes are exactly the same as the ten (10) received bytes, the question becomes how does one know whether the CPU is reading the ten (10) transmitted or the ten (10) received bytes? The existence of the five (5) bytes between the ten (10) transmitted and the ten (10) received bytes provides positive information to the CPU that the ten (10) bytes that the CPU asked to be transmitted were, in fact, transmitted and subsequently received. The five (5) bytes between the ten (10) transmitted bytes and the ten (10) received bytes acts as a buffer or a spacer because, when the CPU reads the FIFO after the loopback test, the CPU will begin reading at the next FIFO location after the one where the transmitter read the last byte to be transmitted, i. e. by reading the five (5) nontransmitted bytes, then the ten (10) transmitted bytes. After the CPU reads the five (5) nontransmitted bytes, the CPU will determine that any bytes that it reads after that will be received bytes. Thus, if the CPU or other test mechanism reads the bytes sent but not transmitted and finally reads the received bytes after the untransmitted bytes, the test of the transmitter and receiver has been successfully accomplished utilizing a loopback circuit having only a single FIFO or buffer.

As shown in FIG. 10, CPU would write ten bytes to the buffer for the transmitter to transmit. The transmitter would transmit the ten (10) bytes to the receiver and the receiver would receive the ten (10) bytes. But at the end of the ten (10) bytes, the receiver would write two (2) CRC bytes 266. Thus, when the CPU looked at the buffer, it would read the ten (10) received bytes and then come to the two (2) CRC bytes and thus it would know that it had read received bytes.

In short, data integrity means (1) not corrupting data and (2) also being able to distinguish transmitted data from received data in the single FIFO. Thus, in the broadest sense, any means of distinguishing transmitted data from received data in a single FIFO could be used to implement the loopback of the present invention.

Changes and modifications in this specifically described embodiment can be carried out without departing from the scope of the invention which is intended to be limited only by the scope of the appended claims.

What is claimed is:

1. A loopback circuit for testing a communication device, the loopback circuit comprising:
   a data transmitter having an input and an output;
   a data receiver having an input and an output;
   a single FIFO having an input operatively connected to the output of said data receiver, and an output operatively coupled to the input of said data transmitter, said single FIFO storing both transmitted data and received data at the end of a loopback test.

2. The loopback circuit of claim 1 further comprising:
   means for distinguishing transmitted data from received data in the single FIFO during loopback testing.

3. The loopback circuit of claim 1 wherein extra transmit data bytes are used to distinguish transmitted data from received data in the FIFO during loopback testing.

4. The loopback circuit of claim 1, further comprising:
   a multiplexer operatively connected between the output of said data receiver and the input of said FIFO, said multiplexer having a first input communicating with a host central processing unit, a second input overatively coupled to said data receiver, and an output operatively coupled to the input of said FIFO.

5. A transceiver comprising:
   a transmitter;
   a receiver, the transmitter being operatively connected to the receiver;
   a single FIFO, operatively positioned in the transceiver, for receiving both transmitted data and received data;
   state control means, operatively connected to the transmitter, the receiver and the FIFO, for enabling the transmitter or enabling the receiver; and
   a loopback circuit for testing a communication device, including a byte counter limiting the number of data bytes to be transmitted, the loopback circuit being operatively connected to the transmitter, the receiver and the single FIFO during loopback testing of the transceiver.

6. The transceiver of claim 5 wherein the state control means further comprises:
   byte counter means, operatively connected to the state control means, the transmitter and the receiver for counting the bytes of data transmitted and received; and
   bit counter means, operatively connected to the byte counter means and the FIFO, for counting the bits of data.

7. The transceiver of claim 5 wherein CRC bytes are used to distinguish transmitted data from received data in the single FIFO during loopback test by virtue of CRC bytes being a positive indication of the receive data being in the FIFO.

8. The transceiver of claim 6 wherein the byte counting means further comprising:
   a programmable byte counter for reserving a portion of the FIFO for transmitting data and for preventing received data from entering the FIFO.

9. The transceiver of claim 5 further comprising:
   means for distinguishing transmitted data from received data in the single FIFO during loopback testing.

10. The transceiver of claim 5 wherein extra transmit data bytes are used to distinguish transmitted data from received data in the single FIFO during loopback testing.

11. An infrared communications controller comprising:
    a synchronous communications engine (SCE);
    a clock generator;
    a plurality of registers;
    a bus interface input/output;
    encoder means for communicating with said clock generator, said bus interface input/output, said plurality of registers, and said SCE;

an output multiplexor operatively connected to said encoder means for commmunicating with an IR transducer module, a communications port, and an auxiliary port; and loopback circuit means operatively positioned in said SCE for performing a loopback test, said loopback circuit means further comprising:
a transmitter;
a receiver; and
a single FIFO operatively connected to both said transmitter and said receiver for storing both transmitted and received data during loopback testing.

12. The controller of claim 11 further comprising:
means for distinguishing transmitted data is from received data in the single FIFO during loopback testing.

13. The controller of claim 11 wherein extra transmit data bytes are used to distinguish transmitted data from received data in the FIFO during loopback testing.

14. The controller of claim 11 further comprising:
a multiplexor, operatively connected between the receiver and the FIFO, for communicating with a host central processing unit, the receiver and the FIFO.

* * * * *